Oct. 13, 1925.

J. G. CAMPBELL

ELECTRICAL APPARATUS

Filed Feb. 24, 1923

1,556,674

Witnesses
Lloyd M. Keighley
Warren Schmieding

Inventor
JOHN G CAMPBELL
By J. Ralph Zehn
His Attorney

Patented Oct. 13, 1925.

1,556,674

UNITED STATES PATENT OFFICE.

JOHN G. CAMPBELL, OF DAYTON, OHIO, ASSIGNOR TO DELCO-LIGHT COMPANY, OF DAYTON, OHIO, A CORPORATION OF DELAWARE.

ELECTRICAL APPARATUS.

Application filed February 24, 1923. Serial No. 621,092.

*To all whom it may concern:*

Be it known that I, JOHN G. CAMPBELL, a citizen of the United States of America, residing at Dayton, county of Montgomery, and State of Ohio, have invented certain new and useful Improvements in Electrical Apparatus, of which the following is a full, clear, and exact description.

This invention relates to speed responsive electrical switches, and has among its objects to provide a simple and compact structure adapted to be mounted upon the shaft of an electrical machine such as a repulsion induction motor employing a commutator for starting purposes. Such a switch may be used for short circuiting the commutator bars after a certain motor speed has been attained.

Other and further objects and advantages of this invention will be apparent from the following description of a preferred form thereof, reference being made to the accompanying drawings.

Figure 1:
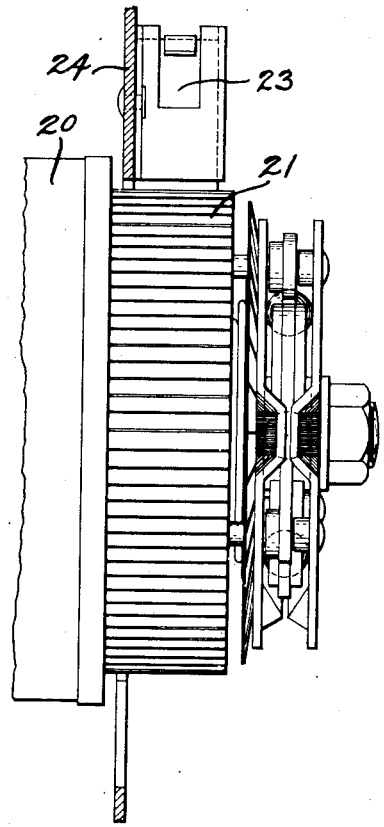
Fig. 1 shows a side elevation of the commutator of a repulsion induction motor and of a short circuiting switch embodying the present invention.

In the drawings, 20 designates a fragment of an armature having conductors connected with commutator 21. Current is led to the commutator through brushes in the well known manner of repulsion induction motors using a commutator. One of these brushes is shown at 23 and is supported upon a bracket 24. Commutator 21 comprises a plurality of bars 22 which are clamped between V rings 25 and 26 cooperating with screws 27. The commutator is press fitted upon an armature sleeve 28 provided with driving engagement with motor shaft 29 through a plurality of washers 30 which are provided with rectangular holes cooperating with the rectangular portion 31 of shaft 29. Washers 30 are provided with radially extending lugs 32 which are received by notches in the end of sleeve 28 in order to provide a driving connection between sleeve 28 and the shaft 29.

Figure 3:
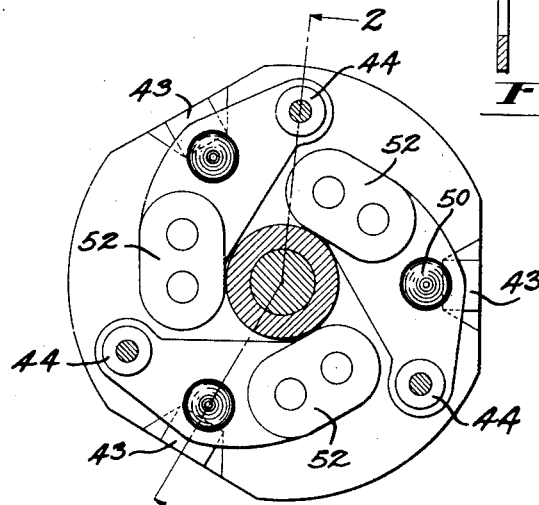
Fig. 3 is a sectional view taken on the line 3—3 of Fig. 2; and the section line 2—2 of Fig. 3 denotes the planes of the longitudinal section of Fig. 2.

The speed responsive switch comprises a hub 40 mounted on the reduced cylindrical end 35 of shaft 29. A nut 36 maintains the hub 40 in position. Hub 40 is attached to a plate 41 provided with portions 42 bent obliquely with respect to the main portion of the plate 41 in order to provide wedging surfaces 43 which are preferably equally spaced as shown in Fig. 3. Studs 44 are riveted to plate 41, and upon these studs are slidably mounted, axially of shaft 29, a switch contact member 45 and a disc 46 having portions 47 providing wedging surfaces 48, each surface 48 being located opposite a wedging surface 43 of plate 41 and obliquely inclined with respect thereto. A spring 49 presses at one end against the parts 30 and at the other against the contact member 45, causing it to be separated from the commutator 21 and the plate 46 to be pressed toward the plate 41 and a plurality of balls 50 to be engaged by adjacent parallel surfaces of the plates 41 and 46. The balls 50 are located within apertures 51 provided in weight members 52 which are pivotally mounted upon the studs 44.

Figure 2:
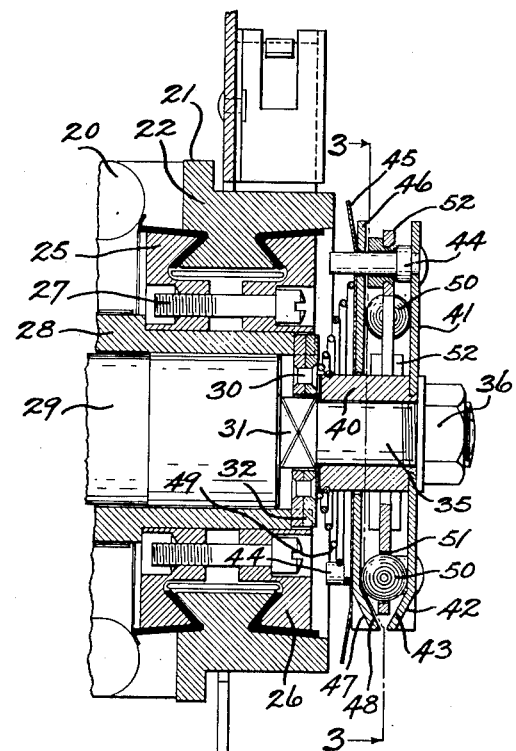
Fig. 2 is a longitudinal sectional view of parts shown in Fig. 1.

When a certain speed has been attained by the motor, the weights 52 will move out from the shaft 29 causing the balls 50 to move toward the narrower portion of the space between each pair of wedging surfaces 43 and 48, thereby causing the plate 46 and the contact 45 to move to the left as viewed in Figs. 1 and 2 so that switch contact 45 may be pressed against the end of the commutator 21 to short circuit the commutator bars. The motor will then operate as a simple induction motor for reasons well known to those skilled in the art.

When the motor stops the spring 49 will return the balls 50 and weights 52 to the position shown in the drawings.

By removing nut 36, the switch mechanism may be removed as a unit from the shaft without disturbing other parts mounted thereon.

It is understood, however, that this invention is susceptible of other uses, and especially where the switch or circuit breaking mechanism is adapted to be located partly or wholly upon a rotating shaft.

While the form of mechanism herein shown and described constitutes a preferred embodiment of one form of invention, it is to be understood that other forms might be adopted and various changes and alterations made in the shape, size, and proportion of the elements therein without departing from the spirit and scope of the invention.

What is claimed is as follows:

1. A commutator short-circuiting device for an electric motor comprising, in combination, a rotatable member including a plate carried by the rotatable member and located adjacent the commutator of the motor, a second plate longitudinally movable with respect to the shaft of the motor, one of said plates being provided with a camming surface; a weight interposed between said plates and pivotally mounted upon said rotating member, a member carried by said weight and adapted to engage one of said plates and the camming surface of the other plate for moving said movable plate, and a contact operated by the movable plate for engaging the bars of the commutator.

2. A commutator short-circuiting device for an electric motor comprising, in combination, a rotatable member including a plate carried by the rotatable member and located adjacent the commutator of the motor, a second plate longitudinally movable with respect to the shaft of the motor, one of said plates being provided with a camming surface; a weight interposed between said plates and pivotally mounted upon said rotating member, said weight having an aperture extending therethrough, a member extending through said aperture and adapted to engage one of said plates and the camming surface of the other plate for moving said movable plate, and a contact operated by the movable plate for engaging the bars of the commutator.

3. A commutator short-circuiting device for an electric motor comprising, in combination, a rotatable member including a plate carried by the rotatable member and located adjacent the commutator of the motor, a second plate longitudinally movable with respect to the shaft of the motor, said plates being provided with oppositely-inclined wedging surfaces adjacent each other, a weight interposed between said plates and pivotally mounted upon said rotatable member, a member carried by said weight and adapted to engage said wedging surfaces for moving said movable plate, and a contact operated by the movable plate for engaging the bars of the commutator.

4. A commutator short-circuiting device for an electric motor comprising, in combination, a rotatable member including a plate carried by the rotatable member and located adjacent the commutator of the motor, a second plate longitudinally movable with respect to the shaft of the motor, said plates being provided with oppositely-inclined wedging surfaces adjacent each other, a weight interposed between said plates and pivotally mounted upon said rotatable member, said weight having an aperture extending therethrough, a ball carried within said aperture and adapted to engage said wedging surfaces for moving said movable plate, and a contact operated by the movable plate for engaging the bars of the commutator.

In testimony whereof I hereto affix my signature.

JOHN G. CAMPBELL.